United States Patent
Shah et al.

(10) Patent No.: US 10,791,732 B2
(45) Date of Patent: Oct. 6, 2020

(54) WATER DISPERSIBLE GRANULAR COMPOSITION

(75) Inventors: Deepak Pranjivandas Shah, Maharashtra (IN); Puthenveetil Kunjukrishna Menon Ramdas, Maharashtra (IN); Balachandran Thankappan Vadakkekuttu, Maharashtra (IN)

(73) Assignee: DEEPAK PRANJIVANDAS SHAH, Mumbai (IN)

( * ) Notice: Subject to any disclaimer, the term of this patent is extended or adjusted under 35 U.S.C. 154(b) by 0 days.

(21) Appl. No.: 13/202,125

(22) PCT Filed: Feb. 18, 2010

(86) PCT No.: PCT/IN2010/000097
§ 371 (c)(1),
(2), (4) Date: Aug. 18, 2011

(87) PCT Pub. No.: WO2010/095151
PCT Pub. Date: Aug. 26, 2010

(65) Prior Publication Data
US 2011/0306502 A1    Dec. 15, 2011

(30) Foreign Application Priority Data
Feb. 20, 2009   (IN) .......................... 385/MUM/2009

(51) Int. Cl.
| A01N 25/12 | (2006.01) |
| A01N 25/14 | (2006.01) |
| A01N 47/02 | (2006.01) |
| A01N 53/00 | (2006.01) |
| A01N 43/54 | (2006.01) |
| A01N 43/653 | (2006.01) |
| A01N 57/16 | (2006.01) |
| A01N 51/00 | (2006.01) |
| A01N 43/40 | (2006.01) |

(52) U.S. Cl.
CPC ............. *A01N 25/14* (2013.01); *A01N 43/54* (2013.01); *A01N 43/653* (2013.01); *A01N 47/02* (2013.01); *A01N 51/00* (2013.01); *A01N 53/00* (2013.01); *A01N 57/16* (2013.01)

(58) Field of Classification Search
CPC .... A01N 2300/00; A01N 25/14; A01N 53/00; A01N 57/16; A01N 43/54; A01N 43/653; A01N 47/02; A01N 51/00
USPC .......................................................... 504/367
See application file for complete search history.

(56) References Cited

U.S. PATENT DOCUMENTS

| 5,223,524 | A | * | 6/1993 | Valcke ........................ 514/383 |
| 5,739,081 | A | * | 4/1998 | Lloyd et al. .................. 504/361 |
| 5,945,114 | A | * | 8/1999 | Ogawa et al. ................ 424/408 |
| 6,410,481 | B1 | * | 6/2002 | Rochling et al. ............. 504/144 |
| 2006/0014724 | A1 | | 1/2006 | Jadhav |
| 2009/0305889 | A1 | * | 12/2009 | Cush ............................ 504/101 |

FOREIGN PATENT DOCUMENTS

| CN | 1299596 A | * | 6/2001 |
| EP | 0541056 | | 5/1993 |
| WO | WO 2005/039288 A2 | | 5/2005 |
| WO | WO 2005039288 A2 | * | 5/2005 |

* cited by examiner

*Primary Examiner* — Sreenivasan Padmanabhan
*Assistant Examiner* — Courtney A Brown
(74) *Attorney, Agent, or Firm* — Ladas & Parry LLP

(57) ABSTRACT

A water dispersible granular composition comprising: at least one solid agrochemically active substance; at least one sorptive filler; at least one first agrochemically acceptable excipient; at least one liquid or low melting agrochemically active substance; and, at least one second agrochemically acceptable excipient. The invention further relates to a process of preparing the water dispersible granular composition.

33 Claims, No Drawings

WATER DISPERSIBLE GRANULAR COMPOSITION

CROSS REFERENCE TO RELATED APPLICATIONS

This application is a § 371 National State Application of PCT/IN2010/00097 filed Feb. 18, 2010 which claims priority to IN 385/MUM/2009 filed. Feb. 20, 2009.

TECHNICAL FIELD

The present invention relates to a novel water dispersible granular composition comprising at least one solid agrochemically chemically active substance, at least one liquid or low melting agrochemically active substance and at least one sorptive filler for agrochemical and public health use. The invention further relates to a novel process for the preparation of the water dispersible granular composition and a method of application of the composition.

BACKGROUND OF THE INVENTION

It has been observed that plants or pests tend to develop resistance to stand alone compositions of agrochemically active substances on their repeated use. Hence, there is always a need to develop agrochemical compositions comprising combinations of active substances having different mode and site of action so as to reduce or delay the development of resistance in plants or pests. In addition such carefully selected multicomponent products often exhibit synergetic effect leading to reduction of overall use of the actives and significantly prevent injudicious and often unscientific tank mixing of individual pesticidal products by the user. The user will be immensely benefitted if such a combination product is made available to him as water dispersible granules (WG) which are distinguished by several user and environment friendly characteristics such as ease of use, storage and packing, freedom from dust and minimum use of toxic, volatile, inflammable, non-biodegradable solvents, when compared to the solid formulations like wettable powders (WP) and liquid products like emulsifiable concentrates (EC), soluble liquids (SL), concentrated emulsions (EW) and suspension concentrates (SC). WG formulations comprising solid active substances having relatively high melting point (m.p.>70° C.) are well known. They can be prepared by several techniques such as extrusion, spray granulation and pan granulation. However, difficulties have been observed in developing free flowing, dustless dispersible WG formulations comprising liquid or low-melting solid active substances (m.p<70° C.), due to the physical nature of these actives. These difficulties obviously get compounded when we try to combine a liquid/low melting active with a solid active substance in order to prepare a WG formulation with good dispersion consisting of both solid actives and liquid actives in the biologically desired concentration. While the standard processes of preparing WG compositions have been known, these processes are not generally feasible when preparing a combination of a solid active ingredient and a liquid or low melting active substance. The compositions developed by these processes do not possess good dispersion, stability, shelf life and other properties a WG should have.

U.S. Pat. No. 6,410,481 describes water dispersible granules comprising a solid active and a liquid active prepared from aqueous suspo-emulsions of the active components. However granulation of such composite dispersions of solid and liquid actives can cause several problems due to crystallization, coalescence and agglomeration of emulsion droplets etc. Similarly U.S. Pat. No. 4,936,901 describes a process, which is rather complex, involving the spray granulation of mixture of suspensions of non-encapsulated solid active and encapsulated liquid/low melting active substance. The basic drawback of these processes is the drying of such suspo-emulsions/dispersions which is the most crucial step in the entire process, as many problems can arise during evaporation of the flammable solvent in the drying step. The mentioned processes pose environmental hazards and are thus not environmentally friendly.

Similarly, US20090208423 discloses an insecticidal composition comprising imidacloprid, lambda-cyhalothrin and a conventional agriculturally acceptable carrier or excipient formulated as an aqueous formulation or dry based formulations. The application discloses a process of mixing the actives and the excipients to obtain a homogenous mixture of all ingredients, which is micronized and granulated to yield the granular formulation. A similar process is also disclosed in U.S. Pat. No. 5,945,114. While this process is acceptable, micronising the inert fillers in which liquid active is absorbed can pose several problems since the liquid naturally tends to come out during fine grinding. Such compositions obtained do not generally exhibit good dispersibility and shelf life especially since the low melting actives undergoes a phase change during the ambient storage temperatures (−5 to 50° C.) leading to caking and crystal growth.

Further, WO2009007999 discloses a water-dispersible dry granule formulation comprising: a water-disintegrable aggregation of a liquid pyrethroid compound adsorbed on a specific composition of inert fillers, formulated with other inert formulation adjuvants. However, the patent application discloses only a single liquid active in the composition.

Similarly, WO1997034477 discloses an agricultural carrier comprising a granular carrier composed of plant fibers and mineral filler adapted for carrying a low-melting pesticide, wherein the low-melting chemical such as chlorpyrifos is combined with an aromatic solvent. However the patent application discloses only a single low-melting pesticide in the composition and the granules are more suited for direct application.

U.S. Pat. No. 5,739,081 describes a WG formulation suitable for agricultural applications and a method for preparing the granules, according to which the active ingredient in the liquid form, is absorbed into a blank granule comprising an inert filler which forms the WG. The patent discloses the use of sorptive fillers in the size range of less than 150 microns or preferably in a range of about 1-50 microns so that the suspended filler particles do not clog the spray nozzle, wherein the desired particle size is achieved by air-milling or jet milling. However, the patent discloses a composition comprising only a single liquid active ingredient in the form of water dispersible granules.

Various patents teach combinations of specifical pesticidal actives, such as tebuconazole and lambda cyahalothrin, imidachloprid and lambda cyhalothrin, fipronil and lambda cyhalothrin, azoxystrobin and lambda cyhalothrin, azoxystrobin and propiconazole, etc. See, US2007021385, WO2006107905, WO 2006061164 U.S. Pat. No. 6,559,175, WO9749285, WO9616543, WO2002045507, WO2009112836, WO2008030753, WO2009095656, DE10343872, WO2004017734 and US6355675 However, these patents only provide compositions in the form of emulsifiable concentrates, microemulsifiable compositions, emulsions in water, or suspension concentrates. As pointed out earlier, these formulations are not preferred and suffer from various disadvantages including the toxicity by solvents, uneasiness of use, shipping and storage required due to the nature of these formulations, etc.

WO2007112339 discloses dry spreadable or broadcast granule compositions of solid active such as azoxystrobin and liquid active such as propiconazole. However, the composition of this patent provides ready to use or broadcast granules for direct application and the granules will not disperse readily in water. US20080261816 discloses a flowable granular material of solid active such as azoxystrobin and liquid active such as propiconazole. However, the patent discloses granules for direct application and the granules are not water dispersible.

CN 1836513, WO 2005096820, WO 2002028186, CN 1274530 and WO 9522902 discloses compositions comprising solid actives such as fipronil, imidacloprid and liquid actives such as lambda-cyhalothrin and chlorpyrifos wherein the compositions are formulated as an oil emulsion, ultra-low content spray, oil-in-water emulsion, microemulsion, suspension, wettable powder, water dispersible granule, dry suspension, granule, water solution, wettable powder, aerosol, suspension concentrates and emulsifiable concentrates. While these patents generally disclose various formulations of a combination of pesticidal actives, including a water dispersible granule, the patents do not provide or teach a method of preparing the water dispersible granule composition. Commercial products based on the above combinations are not readily available in a water dispersible granule composition. As pointed out earlier, standard processes for preparing a water dispersible granule for a combination of the pesticidal actives above may not be feasible and would not provide a satisfactory composition as such compositions do not possess good dispersion, stability, shelf life and other properties that a WG should have.

WO 2008080542 discloses compositions comprising solid active such as fipronil and liquid active such as lambda-cyhalothrin. CN 1186602 discloses a synergistic insecticidal mixtures comprising a liquid active such as chlorpyriphos and a solid active such as deltamethrin. Smiderle, Oscar Jose, et al; insecticide treatment and seed quality of corn during storage, Scientia Agricola (Piracicaba, Brazil), (1999), 56(4, Supl.), 1245-1254 discloses seed treatments with compositions comprising solid actives such as deltamethrin and liquid actives such as chlorpyrifos. US20090120339 discloses a composition, comprising, a top dressing material and a moist formulation of solid active such as azoxystrobin and liquid active such as propiconazole. Again, these patents do not provide or teach a composition of the combination in a water dispersible granule form.

Hence, there is a long felt need to develop an alternative, simple and an efficient granulation process for developing a composition comprising a combination of a solid active substance and a liquid or a low melting solid active substance, wherein the particle size of the solid active substance and the filler is effectively controlled to ensure optimum bio-efficacy of the composition. Also there is a need for developing such a composition comprising a solid active and a low-melting or liquid active substance, wherein the composition overcomes the drawbacks of the prior art and exhibits excellent dispersibility, suspensibility and storage properties. Also there is a need to develop a composition in the form of WG, wherein the composition is highly synergistic and exhibits increased bio-efficacy with reduced dosages, as compared to the individual use of the solid and the liquid or low-melting active substances.

SUMMARY OF THE INVENTION

The present invention relates to a water dispersible granular composition comprising: at least one solid agrochemically active substance; at least one sorptive filler; at least one first agrochemically acceptable excipient; at least one liquid or low melting agrochemically active substance; and at least one second agrochemically acceptable excipient.

The present invention also relates to a process for the preparation of the novel water dispersible granular composition comprising the steps of:

a). preparing a fine suspension of at least one solid agrochemically active substance and at least one first agrochemically acceptable excipient in water;

b). preparing a filler base of at least one sorptive filler and at least one first agrochemically acceptable excipient;

c). blending the suspension of step a) with the filler base of step b) to get a wet mass;

d). extruding and drying the wet mass of step c) to get water dispersible granules of the at least one solid agrochemically active substance;

e). preparing an emulsifiable solution comprising at least one liquid or low melting agrochemically active substance and at least one second agrochemically acceptable excipient; and, f). absorbing the emulsifiable solution of step e) in the water dispersible granules of step d) to obtain the water dispersible granular composition.

The present invention further relates to a water dispersible granule composition comprising at least one solid agrochemically active substance; at least one sorptive filler; at least one first agrochemically acceptable excipient; at least one liquid or low melting active substance; and at least one second agrochemically acceptable excipient; wherein the composition is prepared by the process above.

The present invention further relates to a kit comprising a novel water dispersible composition and a plurality of instructions for a method of application of the novel water dispersible composition.

DETAILED DESCRIPTION

In describing the embodiment of the invention, specific terminology is resorted for the sake of clarity. However, it is not intended that the invention be limited to the specific terms so selected and it is to be understood that each specific term includes all technical equivalents that operate in a similar manner to accomplish a similar purpose.

The present invention relates to a novel water dispersible granular composition comprising: at least one solid agrochemically active substance; at least one sorptive filler; at least one first agrochemically acceptable excipient; at least one liquid or low melting agrochemically active substance; and, at least one second agrochemically acceptable excipient, According to an embodiment, the liquid or low melting agrochemical active substance and the second agrochemically acceptable excipient are absorbed into granules, which contain the solid agrochemically active substance, the sorptive filler and the first agrochemically acceptable excipient.

The solid agrochemically active substance can include agrochemically active substances having a melting point above 70° C. According to an embodiment, the solid agrochemically active substance is present in a range of about 0.1% to about 45% of the total weight of the composition.

According to another embodiment, the solid agrochemically active substance is selected from the group comprising at least one of biocides, herbicides, insecticides, fungicides, acaricides, nematicides, pheromones, plant growth regulators and/or repellents.

According to a further embodiment, the solid agrochemically active substance is selected from the group comprising insecticides selected from Acephate, Acetamiprid, Abamectin, Bacillus thuringiensis, Bendiocarb, Benfuracarb, Beta Cyfluthrin, Bifenazate, Buprofezin, Captan, Carbaryl, Carbofuran, Carbosulfan, Cartap Hydrochloride, Chlorfenapyr, Deltamethrin, Diazinon, Emamectin benzoate, Fenpyroximate, Fipronil, Flubendiamide, Flufenzine, Hexythiazox, Imidacloprid, Lindane, Metaldehyde, Prallethrin, Thiacloprid, Thiamethoxam, Thiodicarb; herbicides selected from 2,4-Dichlorophenoxy Acetic Acid, Alphanaphthyl Acetic Acid, Atrazine, Bensulfuron, Bispyribac sodium, Chlorimuron ethyl, Cyhalofop-butyl, Difenthiuron, Diflubenzuron, Diuron, Ethoxysulfuron, Flufenoxuron, Forchlorfenuron, Glufosinate, Ammonium, Glyphosate, Hexazinone, lmazethapyr, Isoproturon, Linuron, Lufenuron, Metamitron, Methabenzthiazuron, Methyl Chlorophenoxy Acetic Acid (MCPA), Metribuzin, Metsulfuron Methyl, Novaluron, Nicosulfuron, Orthasulfuron, Paraquat dichloride, Pyrithiobac sodium, Rimsulfuron, Sulfosulfuron, Thifensulfuron and Tribenuron methyl; and fungicides selected from Azoxystrobin, Benomyl, Bitertanol, Captan, Carbendazim, Carboxin, Carpropamid, Chlorothalonil, Copper Hydroxide, Copper Oxychloride, Copper Sulphate, Cuprous Oxide, Cymoxanil, Cyproconazole, Dazomet, Difenocenazole, Dimethomorph, Dithianon, Dodine, Epoxiconazole, Fenarimol, Fosetyl-Al, Hexaconazole, Iprodione, Kasugamycin, Kresoxim-methyl, Mancozeb, Metiram, Oxycarboxin, Paclobutrazole, Pencycuron, Picoxystrobulin, Propineb, Sulphur, Thiophanate-Methyl, Tebuconazole, Thifluzamide, Thiram, Tricyclazole, Trifloxystrobulin, Zineb and Ziram.

According to yet another embodiment, the solid agrochemically active substance is selected from the group comprising imidacloprid, fipronil, thiamethoxam, deltamethrin, tebuconazole and azoxystrobin.

The liquid agrochemically active substance can include agrochemically active substances having melting point below 70° C. According to an embodiment, the liquid agrochemically active substance is present in a range of about 0.1% to about 25% of the total weight of the composition.

According to an embodiment, the liquid or low melting agrochemically active substance is selected from the group comprising at least one of biocides, herbicides, insecticides, fungicides, acaricides, nematicides, pheromones, plant growth regulators and/or repellents.

According to another embodiment, the liquid or low melting agrochemically active substance is selected from the group comprising insecticides selected from Acequinocyl, Acrinathrin, Allethrin, Alphacypermethrin, Azinphos-ethyl, Azinphos-methyl, Benzoximate, Bifenthrin, Bioresmethrin, Bromophos-ethyl, Bromopropylate, Carbophenothion, Chlorfenvinphos, Chlorimephos, Chlorofenvinphos, Chlorpyrifos, Chlorpyriphos Methyl, Cypermethrin, Cyphenothrin, Demeton-S-methy, Diazinon, Dichlorovos, Dicofol, Dimethoate, Dinocap, Disulfoton, D-trans Allethrin, Edifenphos, EPN, Ethephon Ethion, Ethofenprox (Etofenprox), Fenamiphos, Fenazaquin, Fenitrothion, Fenobucarb (BPMC), Fenpropathrin, Fenthion, Fenvalerate, Fluvalinate, Fonofos, Imiprothrin, Indoxacarb, Isofenphos, Lambda cyhalothrin, Malathion, Mecarbam, Mephosfolan, Methomyl, Methoxychlor, Methyl Parathion, Methyldymron, Monocrotophos, Parathion, Permethrin, Phenthoate, Phorate, Phosalone, Phosphamidon, Pirimiphos-methyl, Profenofos, Propargite, Propetamphos, Propoxur, Prothiofos, Pyridalyl, Pyriproxyfen, Quinalphos, Resmethrin, S-bioallethrin, Tefluthrin, Temephos, Thiometon, Transfluthrin, Triazamate, Triazophos and Trichlorofon; herbicides selected from Acetochlor, Alachlor, Anilophos, Beflubutamid, Benfuresate, Bensulide, Butachlor, Butamifos, Butralin, Butroxydim, Butylate, Carfentazone Ethyl, Chlorpropham, Clodinafop-propargyl, Clomazone, Cloquintocetmexyl, Cycloxydim, Cyfluthrin, Cyhalofop-butyl, Diclofop-Methyl, Dimethametryn, Dithiopyr, Fenoxaprop-p-Ethyl, Fentrazamide, Fluazifop-P-butyl, Fluchloralin, Flufenacet, Fluorochloridone, Metazachlor, Metolachlor, Molinate, Oxadiazon, Oxyfluorfen, Pebulate, Pendimethalin, Pretilachlor, Propachlor, Propanil, Propaquizafop, Prosulfocarb, Quizalofop ethyl, Quizalofop-P-tefuryl, Tebutam, Tepraloxydim, ThiobencarbKK, Triallate and Trifluralin and fungicides selected from 2-Phenylphenol, Bromuconazole, Cyprodinil, Difenoconazole, Dinocap, Dodemorph, Edifenphos, Etridiazole, Fenpropimorph, Flusilazole, Imazalil, Iprobenfos (KitazinKK), Isoprothiolane, Metalaxyl, Myclobutanil, Nitrothal-isopropyl, Penconazole, Picoxystrobin, Propiconazole, Pyraclostrobin, Pyrifenox, Tetraconazole, Triadimefon, Tridemorph and Trifloxystrobin.

According to a further embodiment, the liquid or low melting agrochemically active substance is selected from the group comprising lambda cyhalothrin, cypermethrin, chlorpyrifos and propiconazole.

According to an embodiment, the solid agrochemically active substance is imidacloprid and the liquid or low melting agrochemically active substance is lambda cyhalothrin.

According to another embodiment, the solid agrochemically active substance is fipronil and the liquid or low melting agrochemically active substance is lambda cyhalothrin.

According to another embodiment, the solid agrochemically active substance is thiamethoxam and the liquid or low melting agrochemically active substance is cypermethrin.

According to a further embodiment, the solid agrochemically active substance is imidacloprid and the liquid or low melting agrochemically active substance is chlorpyrifos.

According to a further embodiment, the solid agrochemically active substance is fipronil and the liquid or low melting agrochemically active substance is chlorpyrifos.

According to a further embodiment, the solid agrochemically active substance is deltamethrin and the liquid or low melting agrochemically active substance is chlorpyrifos.

According to a further embodiment, the solid agrochemically active substance is tebuconazole and the liquid or low melting agrochemically active substance is lambda cyhalothrin.

According to a further embodiment, the solid agrochemically active substance is azoxystrobin and the liquid or low melting agrochemically active substance is lambda cyhalothrin.

According to yet another embodiment, the solid agrochemically active substance is azoxystrobin and the liquid or low melting agrochemically active substance is propiconazole.

The term "sorptive filler" as used herein can be a filler which has the capacity to absorb or adsorb at least 20% and preferably at least 100% of its own weight of oil, as measured by the linseed oil rub-out test (ASTM D281.28), and is thus capable of retaining substantial quantities of the volatile active material within the water dispersible granules. It is observed that the overall absorbing capacity of the granules usually increases when sorptive fillers are used in the composition.

According to an embodiment, the sorptive filler comprises diatomaceous earth, kaolin, bentonite, precipitated silica, attapulgite, and perlite.

According to another embodiment, the sorptive filler is present in a range of about 5% to about 50% of the total weight of the composition.

According to an embodiment, the first agrochemically acceptable excipient and the second agrochemically acceptable excipient are selected from the group comprising dispersing agents, wetting agents, emulsifiers, binders, solvents, and diluents.

According to another embodiment, the first agrochemically acceptable excipient and the second agrochemically acceptable excipient are present in a range of about 5% to about 50% of the total weight of the composition.

The dispersing agent is a compound which ensures that the particles remain suspended in the application mixture and which allows rapid disintegration of the granule in the water. The dispersing agent can be an ionic or non-ionic agent or a mixture of such surface-active agents. According to an embodiment, the dispersing agents are selected from the group comprising polycarboxylates, naphthalene sulfonate condensates, phenol sulfonic acid condensates, lignosulfonates, methyl oleyl taurates and polyvinyl alcohols. However, those skilled in the art will appreciate that it is possible to utilize other dispersing agents known in the art without departing from the scope of the invention. The dispersing agent is present in the composition in a range of about 1% to about 20% of the total weight of the composition.

The wetting agent is a compound which facilitates rapid wetting of the granule when the granule is introduced into the water. According to an embodiment, the wetting agents are selected from the group comprising sulfosuccinates, naphthalene sulfonates, sulfated esters, phosphate esters, sulfated alcohol and alkyl benzene sulfonates. However, those skilled in the art will appreciate that it is possible to utilize other wetting agents known in the art without departing from the scope of the invention. The wetting agent is present in the composition in a range of about 1% to about 10% of the total weight of the composition.

The emulsifiers that can be used in accordance with the invention should be compatible with the liquid active substance and with the other components of the formulation. Emulsifiers which do not cause the liquid active substance to solidify are particularly preferred. Some liquid actives are completely miscible in water and may not require an emulsifier. The emulsifier is present in the emulsifiable concentrate in a range of about 1% to about 15% w/w. These emulsifiers are usually used in admixture. The actual ratio varies depending on the liquid active. The emulsifiers can be of the anionic, cationic or non-ionic type. According to an embodiment, the emulsifiers can be selected from a group comprising ethoxylated and ethopropoxylated alcohols and nonyl phenols, ethoxylated tristeryl phenol, ethoxylated tristeryl phenol phosphates, ethoxylated and ethopropoxylated castor oil, calcium alkyl benzene sulfonates and proprietary blended emulsifiers. However, those skilled in the art will appreciate that it is possible to utilize other emulsifiers known in the art without departing from the scope of the invention.

According to a further embodiment, the binders are selected from a group comprising polysaccharides, sucrose, starch syrup, dextrose, methylcellulose, carboxymethyl cellulose, polyvinylpyrrolidones, starch, polyethylene glycols, partially hydroxylated polyvinyl acetate and polymeric adhesives alone or in combination. However, those skilled in the art will appreciate that it is possible to utilize other binders known in the art without departing from the scope of the invention. The binders are present in the composition in a range of about 0.1% to about 2% of the total weight of the composition.

According to a further embodiment, the solvents are selected from the group comprising one or more of N,N-dimethyl decanamide, N-methylpyrrolidone, cyclohexanone, dimethyl formamide, tetrahydrofuran, dimethylsulfoxide, petroleum distillates and chlorobenzenes. However, those skilled in the art will appreciate that it is possible to utilize other solvents known in the art without departing from the scope of the invention.

According to a further embodiment, the diluents are selected from the group comprising one or more of tone calcite, mica, soap powder, dolomite and lactose. However, those skilled in the art will appreciate that it is possible to utilize other diluents known in the art without departing from the scope of the invention. The diluents are present in the composition in a range of about 5% to about 50% w/w.

According to a further embodiment, the composition further comprises one or more of antifoaming agents, stabilizers, buffering agents, chelating agents and colouring agents.

According to an embodiment, the granules are in a size range of about 10 mesh to about 100 mesh.

Another embodiment of the invention relates to a novel process for the preparation of the novel water dispersible granular composition. The process comprises:
  a). preparing a fine suspension or dispersion of at least one solid agrochemically active substance and at least one first agrochemically acceptable excipient in water;
  b). preparing a filler base of at least one sorptive filler and at least one agrochemically acceptable excipient;
  c). blending the suspension or dispersion of step a) with the filler base of step b) to get a wet mass;
  d). extruding and drying the wet mass of step c) to get water dispersible granules of the at least one solid agrochemically active substance;
  e). preparing an emulsifiable solution comprising at least one liquid or low melting agrochemically active substance and at least one second agrochemically acceptable excipient; and,
  f). absorbing the emulsifiable solution of step e) in the water dispersible granules of step d) to obtain the water dispersible granular composition.

According to an embodiment, the fine suspension of step a) is wet milled in a suitable milling apparatus to an average particle size of less than 2 microns to get a fine suspension of the solid agrochemically active substance.

According to another embodiment, the filler base of step b) comprising the sorptive filler at least one agrochemically acceptable excipient is micronized to an average particle size of less than 50 microns through an air jet mill to get a sorptive filler base. Preferably, the filler base is micronized to a particle size range of about 10 microns.

The invention further relates to a water dispersible granule composition comprising at least one solid agrochemically active substance; at least one sorptive filler; at least one first agrochemically acceptable excipient; at least one liquid or low melting active substance and at least one second agrochemically acceptable excipient, wherein the composition is prepared by a process as disclosed above.

The present invention relates to a method of application of an effective amount of a water dispersible granular composition wherein the composition comprises at least one solid agrochemically active substance; at least one sorptive filler; at least one first agrochemically acceptable excipient; at least one liquid or low melting agrochemically active substance; and, at least one second agrochemically acceptable excipient, in agricultural or horticultural crops, forestry, veterinary medicine or livestock husbandry, or pests in cases for public health.

The present invention further relates to a kit comprising:
a). a novel water dispersible granular composition comprising: at least one solid agrochemically active substance; at least one sorptive filler; at least one first agrochemically acceptable excipient; at least one liquid or low melting active substance; and, at least one second agrochemically acceptable excipient; and,
b). a plurality of instructions for a method of application of the novel water dispersible composition.

The novel water dispersible granular composition of the invention exhibits high dispersibility, suspensibility, enhanced bio-efficacy and broader spectrum of activity. Additionally, there are several other advantages with regards to packing, transportation, storage and toxicity. The compositions are dust-free, easy to pour and measure while being safe to the user. The WG compositions of the invention provide for a safer ecosystem by loading lesser toxicant in the composition and getting higher crop protection. The WG compositions showed reduced occupational hazards to the spray operator as compared to stand alone products by reducing the number of applications to half. Further, the water requirement is reduced to about half approximately as compared to the stand alone products where two separate applications are required vis-à-vis one application of the combination product. These WG compositions comprising a combination of solid and liquid actives exhibit synergetic effect leading to reduction of the overall use of the actives. The compositions significantly prevent injudicious and often unscientific tank mixing of individual pesticidal products by the user. With the different mode and site of action, the chances of development of resistance by the pest, is either reduced or eliminated. Further, due to its systemic and contact function, the WG composition is effective in controlling both sucking and chewing and biting type of pests. The WG compositions broaden the spectrum profile within different species of the same pests.

The process allows for the preparation of water dispersible granular composition comprising at least one solid and at least one liquid active, in a simple, cost-effective and environmentally safe manner.

The present invention will be illustrated in more detail with reference to the following formulation examples and test examples. As will be recognized by one skilled in the art, these examples are just illustrative and are not meant to be limiting.

A. Formulation Examples

The following examples illustrate the basic methodology and versatility of the invention.

Example 1

Process for the Preparation of a Water Dispersible Granular Composition of Imidacloprid 12%+Lambdacyhalothrin 6%
Step 1: Preparation of Aqueous Suspension of Imidacloprid:
34.5 parts by weight of Imidacloprid technical, 2.0 parts of naphthalene sulfonate, 4.0 parts of naphthalene sulfonate condensate and 6.0 parts of lignin sulfonate were thoroughly mixed with 53.3 parts of water containing 0.2 part of antifoam. The dispersion was then wet milled using a horizontal small media bead mill to an average particle size of less than 2 microns to get a fine suspension of Imidacloprid having the following composition:

TABLE 1

| Ingredient | % w/w |
| --- | --- |
| Imidacloprid technical (97% a.i) | 34.5 |
| Naphthalene sulfonate | 2.0 |
| Naphthalene sulfonate condensate | 4.0 |
| Lignin sulfonate | 6.0 |
| Silicone anti foam emulsion | 0.2 |
| Water | 53.3 |

Step 2: Preparation of Sorptive Dispersible Filler Base

A blended mixture of 2 parts by weight of naphthalene sulfonate, 10.0 parts of lignin sulfonate, 10.0 parts of naphthalene sulfonate condensate, 30.0 parts of mica and 48.0 parts of perlite was micronised to an average particle size of less than 10 microns through an air jet mill to get a sorptive filler base having the following composition:

TABLE 2

| Ingredient | % w/w |
| --- | --- |
| Naphthalene sulfonate | 2.0 |
| Naphthalene sulfonate condensate | 10.0 |
| Lignin sulfonate | 10.0 |
| Perlite | 48.0 |
| Mica | 30.0 |

Step 3: Preparation of a Wet Mass 76.6 parts by weight of filler base from step 2 was mixed with 50 parts by weight of suspension from Step 1 to obtain a wet mass.

Step 4: Preparation of Sorptive Water Dispersible Granules of Imidacloprid

The wet mass obtained in step 3 was extruded using a low pressure basket extruder, dried and sieved between 10/40 mesh sieves to get the sorptive water dispersible granules of Imidacloprid having the following composition:

TABLE 3

| Ingredient | % w/w |
| --- | --- |
| Imidacloprid technical (97% a.i) | 17.0 |
| Naphthalene sulfonate | 2.6 |
| Naphthalene sulfonate condensate | 9.8 |
| Lignin sulfonate | 10.8 |
| Perlite | 36.8 |
| Mica | 23.0 |

Step 5: Preparation of Emulsifiable Lambda Cyhalothrin Solution 26 parts by weight of Lambda cyhalothrin technical was dissolved in 34 parts of N,N-dimethyl decanamide containing 40 parts by weight of ethoxylated tristeryl phenol to obtain an emulsifiable solution of Lambda cyhalothrin having the following composition:

TABLE 4

| Ingredient | % w/w |
| --- | --- |
| Lambda cyhalothrin technical (96% a.i) | 26.0 |
| N.N-dimethyl decanamide | 34.0 |
| Ethoxylated tristeryl phenol | 40.0 |

Step 6: Preparation of Imidacloprid 12%+Lambda Cyhalothrin 6% WG.

25 parts by weight of Lambda cyhalothrin solution obtained from Step 4 was sprayed onto 75 parts of Imidacloprid granules from step 3 under mixing to get Imidacloprid 12%+Lambda cyhalothrin 6% WG having the following final composition:

TABLE 5

| Ingredient | % w/w |
| --- | --- |
| Imidacloprid technical (97% a.i) | 12.7 |
| Naphthalene sulfonate | 2.0 |
| Naphthalene sulfonate condensate | 7.4 |
| Lignin sulfonate | 8.1 |
| Perlite | 27.5 |
| Mica | 17.2 |
| Lambda cyhalothrin technical (96% a.i) | 6.6 |
| N.N-dimethyl decanamide | 8.5 |
| Ethoxylated tristeryl phenol | 10.0 |

Example 2

Process for the Preparation of a Water Dispersible Granular Composition of Fipronil 6%+Chlorpyriphos 15%

An aqueous suspension of Fipronil with an average particle size of less than 2 microns was first prepared by wet milling 84.0 parts by weight of Fipronil technical, 2.0 parts of naphthalene sulfonate, 6.0 parts of naphthalene sulfonate condensate and 8.0 parts of lignin sulfonate in 100.0 parts of water. Sorptive water dispersible granules of Fipronil were then prepared as described in Example 1 using 15.0 parts by weight of the suspension and 67.5 parts of filler base prepared as per step 2 of Example 1. Finally 25 parts of an emulsifiable solution was prepared by dissolving 16 parts of Chlorpyriphos technical in 3 parts of N,N-dimethyl decanamide containing 6 parts of ethoxylated tristeryl phenol. The emulsifiable solution was then sprayed onto 75 parts of Fipronil granules to get Fipronil 6%+Chlorpyriphos 15% WO having the following final composition:

TABLE 6

| Ingredient | % w/w |
| --- | --- |
| Fipronil technical (96% a.i) | 6.3 |
| Naphthalene sulfonate | 1.4 |
| Naphthalene sulfonate condensate | 7.3 |
| Lignin sulfonate | 7.3 |
| Perlite | 32.4 |
| Mica | 20.3 |
| Chlorpyriphos technical (95% a.i) | 16.0 |
| N.N-dimethyl decanamide | 3.0 |
| Ethoxylated tristeryl phenol | 6.0 |

Example 3

Process for the Preparation of a Water Dispersible Granular Composition of Thiamethoxam 10%+Cypermethrin 12%

An aqueous suspension of Thiamethoxam with an average particle size of less than 2 microns was prepared by wet milling 73.5 parts by weight of Fipronil technical, 2 parts of naphthalene sulfonate, 8.0 parts of naphthalene sulfonate condensate and 16.5 parts of lignin sulfonate in 100.0 parts of water. Sorptive water dispersible granules of Thiamethoxam were then prepared as described earlier using 28.3 parts by weight of the suspension and 60.9 parts of filler base prepared as per Step 2 of Example 1. Finally 25 parts of an emulsifiable solution was prepared by dissolving 13.2 parts of Cypermethrin technical in 4 parts of N,N-dimethyl decanamide containing 7.8 parts of ethoxylated tristeryl phenol. The emulsifiable solution was sprayed onto 75 parts of Thiamethoxam granules to get Thiamethoxam 10%+Cypermethrin 12% WG having the following final composition

TABLE 7

| Ingredient | % w/w |
| --- | --- |
| Thiamethoxam technical (97% a.i) | 10.3 |
| Naphthalene sulfonate | 1.5 |
| Naphthalene sulfonate condensate | 7.2 |
| Lignin sulfonate | 8.5 |
| Perlite | 29.3 |
| Mica | 18.2 |
| Cypermethrin technical (94% a.i) | 13.2 |
| N.N-dimethyl decanamide | 4.0 |
| Ethoxylated tristeryl phenol | 7.8 |

Example 4

Process for the Preparation of a Water Dispersible Granular Composition of Azoxystrobin 7.5%+Propiconazole 7.5%

An aqueous suspension of Azoxystrobin with an average particle size of less than 2 microns was prepared by wet milling 79.0 parts by weight of Azoxystrobin technical, 2.0 parts of naphthalene sulfonate, 8.0 parts of naphthalene sulfonate condensate and 11.0 parts of lignin sulfonate in 100.0 parts of water. Sorptive water dispersible granules of Azoxystrobin were then prepared as described earlier using 20.0 parts by weight of this suspension and 65.0 parts of filler base prepared as per step 2 of Example 1. Finally 25 parts of an emulsifiable solution was prepared by dissolving 8.0 parts of Propiconazole technical in 5 parts of N,N-dimethyl decanamide containing 12.0 parts of ethoxylated tristeryl phenol. The emulsifiable solution obtained was sprayed onto 75 parts of Azoxystrobin granules to get Azoxystrobin 7.5%+Propiconazole 7.5% WG having the following final composition.

TABLE 8

| Ingredient | % w/w |
| --- | --- |
| Azoxystrobin technical (95% a.i) | 8.0 |
| Naphthalene sulfonate | 1.4 |
| Naphthalene sulfonate condensate | 7.3 |
| Lignin sulfonate | 7.6 |
| Perlite | 31.2 |
| Mica | 19.5 |
| Propiconazole technical (95% a.i) | 8.0 |
| N.N-dimethyl decanamide | 5.0 |
| Ethoxylated tristeryl phenol | 12.0 |

Example 5

Process for the Preparation of a Water Dispersible Granular Composition of Imidacloprid 1%+Chlorpyriphos 15%

An aqueous suspension of Imidacloprid with an average particle size of less than 2 microns was prepared by wet milling 73.7 parts by weight of Imidacloprid technical, 2 parts of naphthalene sulfonate, 8.0 parts of naphthalene sulfonate condensate and 16.3 parts of lignin sulfonate in 100.0 parts of water. Sorptive water dispersible granules of Imidacloprid were then prepared as described earlier using 3.2 parts by weight of the suspension along with 20.0 parts of water and 73.4 parts of filler base prepared as per step 2 of Example 1. Finally 25 parts of an emulsifiable solution was prepared by dissolving 16.0 parts of Chlorpyriphos technical in 3 parts of N,N-dimethyl decanamide containing 6.0 parts of ethoxylated tristeryl phenol phosphate. The emulsifiable solution was sprayed onto 75 parts of Imidacloprid granules to get Imidacloprid 1%+Chlorpyriphos 15% WG having the following final composition:

TABLE 9

| Ingredient | % w/w |
|---|---|
| Imidacloprid technical (96% a.i) | 1.2 |
| Naphthalene sulfonate | 1.6 |
| Naphthalene sulfonate condensate | 7.6 |
| Lignin sulfonate | 7.6 |
| Perlite | 35.0 |
| Mica | 22.0 |
| Chlorpyriphos technical (95% a.i) | 16.0 |
| N.N-dimethyl decanamide | 3.0 |
| Ethoxylated tristeryl phenol phosphate | 6.0 |

Example 6

Process for the Preparation of a Water Dispersible Granular Composition of Fipronil 12%+Lambda Cyhalothrin 3%

An aqueous suspension of Fipronil with an average particle size of less than 2 microns was prepared by wet milling 84.0 parts by weight of Fipronil technical, 2 parts of naphthalene sulfonate, 6.0 parts of naphthalene sulfonate condensate and 8.0 parts of lignin sulfonate in 100.0 parts of water. Sorptive water dispersible granules of Fipronil were then prepared as described earlier using 30.0 parts by weight of this suspension and 60.0 parts of filler base prepared as per step 2 of Example 1. Finally 25 parts of an emulsifiable solution was prepared by dissolving 3.5 parts of Lambda cyhalothrin technical in 9.5 parts of N,N-dimethyl decanamide containing 12.0 parts of ethoxylated tristeryl phenol. The emulsifiable solution was sprayed onto 75 parts of Fipronil granules to get Fipronil 12%+Lambda cyhalothrin 3% WG having the following final composition:

TABLE 10

| Ingredient | % w/w |
|---|---|
| Fipronil technical (96% a.i) | 12.6 |
| Naphthalene sulfonate | 1.5 |
| Naphthalene sulfonate condensate | 6.9 |
| Lignin sulfonate | 7.2 |
| Perlite | 28.8 |
| Mica | 18.0 |
| Lambda cyhalothrin technical (96% a.i) | 3.5 |
| N.N-dimethyl decanamide | 9.5 |
| Ethoxylated tristeryl phenol | 12.0 |

Example 7

Process for the Preparation of a Water Dispersible Granular Composition of Deltamethrin 1%+Chlorpyriphos 14%

An aqueous suspension of Deltamethrin with an average particle size of less than 2 microns was first prepared by wet milling 72.0 parts by weight of Deltamethrin technical, 2 parts of naphthalene sulfonate, 8.0 parts of naphthalene sulfonate condensate and 18.0 parts of lignin sulfonate in 100.0 parts of water. Sorptive water dispersible granules of Deltamethrin were then prepared as described earlier using 3.2 parts by weight of this suspension along with 15 parts of water and 73.4 parts of filler base prepared as per, step 2 of Example 1. Finally 25 parts of an emulsifiable solution was prepared by dissolving 15 parts of Chlorpyriphos technical in 3 parts of N,N-dimethyl decanamide containing 7 parts of ethoxylated tristeryl phenol. The emulsifiable solution was sprayed onto 75 parts of Deltamethrin granules to get Deltamethrin 1%+Chlorpyriphos 14% WG having the following final composition:

TABLE 11

| Ingredient | % w/w |
|---|---|
| Deltamethrin technical (98% a.i) | 1.2 |
| Naphthalene sulfonate | 1.5 |
| Naphthalene sulfonate condensate | 7.4 |
| Lignin sulfonate | 7.7 |
| Perlite | 35.2 |
| Mica | 22.0 |
| Chlorpyriphos technical (95% a.i) | 14.0 |
| N.N-dimethyl decanamide | 3.0 |
| Ethoxylated tristeryl phenol | 8.0 |

Example 8

Process for the Preparation of a Water Dispersible Granular Composition of Tebuconazole 12.5%+Lambda Cyhalothrin 2.5%

An aqueous suspension of Tebuconazole with an average particle size of less than 2 microns was prepared by wet milling 77.0 parts by weight of Tebuconazole technical, 2 parts of naphthalene sulfonate, 8.0 parts of naphthalene sulfonate condensate and 13.0 parts of lignin sulfonate in 100.0 parts of water. Sorptive water dispersible granules of Fipronil were then prepared as described earlier using 34.0 parts by weight of this suspension and 58.0 parts of filler base prepared as per Step 2 of Example 1. Finally 25 parts of an emulsifiable solution was prepared by dissolving 3.0 parts of Lambda cyhalothrin technical in 10.0 parts of N,N-dimethyl decanamide containing 12.0 parts of ethoxylated tristeryl phenol. The emulsifiable solution was sprayed onto 75 parts of Tebuconazole granules to get Tebuconazole 12.5%+Lambda cyhalothrin 2.5% WG having the following final composition:

TABLE 12

| Ingredient | % w/w |
|---|---|
| Tebuconazole technical (98% a.i) | 13.0 |
| Naphthalene sulfonate | 1.5 |
| Naphthalene sulfonate condensate | 7.5 |
| Lignin sulfonate | 8.0 |
| Perlite | 27.5 |
| Mica | 17.5 |
| Lambda cyhalothrin technical (96% a.i) | 3.0 |
| N.N-dimethyl decanamide | 10.0 |
| Ethoxylated tristeryl phenol | 12.0 |

Example 9

Process for the Preparation of a Water Dispersible Granular Composition of Azoxystrobin 12.5%+Lambda Cyhalothrin 2.5%

An aqueous suspension of Azoxystrobin with an average particle size of less than 2 microns was prepared by wet milling 79.0 parts by weight of Azoxystrobin technical, 2 parts of naphthalene sulfonate, 8.0 parts of naphthalene sulfonate condensate and 11.0 parts of lignin sulfonate in 100.0 parts of water. Sorptive water dispersible granules of Azoxystrobin were then prepared as described earlier using 32.0 parts by weight of this suspension and 59.0 parts of filler base prepared as per step 2 of Example 1. Finally 25 parts of an emulsifiable solution was prepared by dissolving 3.0 parts of Lambda cyhalothrin technical in 10.0 parts of N,N-dimethyl decanamide containing 12.0 parts of ethoxylated tristeryl phenol. The emulsifiable solution was sprayed onto 75 parts of Azoxystrobin granules to get Azoxystrobin 12.5%+Lambda cyhalothrin 2.5% WG having the following final composition:

TABLE 13

| Ingredient | % w/w |
| --- | --- |
| Azoxystrobin technical (95% a.i) | 12.7 |
| Naphthalene sulfonate | 1.5 |
| Naphthalene sulfonate condensate | 7.2 |
| Lignin sulfonate | 7.6 |
| Perlite | 28.3 |
| Mica | 17.7 |
| Lambda cyhalothrin technical (96% a.i) | 3.0 |
| N.N-dimethyl decanamide | 10.0 |
| Ethoxylated tristeryl phenol | 12.0 |

Example 10

Process for the Preparation of a Water Dispersible Granular Composition of Imidacloprid 45%+Lambda Cyhalothrin 0.1%

An aqueous suspension of Imidacloprid with an average particle size of less than 2 microns was prepared by wet milling 94.0 parts by weight of Imidacloprid technical, 1 part of naphthalene sulfonate and 5.0 parts of naphthalene sulfonate condensate in 55.0 parts of water. Sorptive dispersible filler base was then prepared as described in Step 2 of Example 1 by blending a mixture of 2 parts by weight of naphthalene sulfonate, 10.0 parts of lignin sulfonate, 10.0 parts of naphthalene sulfonate condensate, 25.0 parts of mica and 53.0 parts of perlite followed by micronisation to an average particle size of less than 10 microns through an air jet mill. Sorptive water dispersible granules of Imidacloprid were then prepared as described earlier by mixing 285.0 parts by weight of Imidacloprid suspension with 150.0 parts of filler base followed by extrusion. Then an emulsifiable solution was prepared by dissolving 1.2 parts of Lambda cyhalothrin technical in 38.8 parts of N,N-dimethyl decanamide containing 60.0 parts of ethoxylated tristeryl phenol. Finally 10 parts of this emulsifiable solution was sprayed onto 90 parts of Imidacloprid granules to get imidacloprid 45.0%+Lambda cyhalothrin 0.1% WG having the following final composition:

TABLE 14

| Ingredient | % w/w |
| --- | --- |
| Imidacloprid technical (95% a.i) | 46.50 |
| Naphthalene sulfonate | 1.30 |
| Naphthalene sulfonate condensate | 6.50 |
| Lignin sulfonate | 4.00 |
| Perlite | 21.50 |
| Mica | 10.10 |
| Lambda cyhalothrin technical (96% a.i) | 0.12 |
| N.N-dimethyl decanamide | 3.88 |
| Ethoxylated tristeryl phenol | 6.00 |

Example 11

The following example of preparation of Imidacloprid 0.1%+Lambda cyhalothrin 25.0% illustrates roughly the minimum limit of solid active and the maximum limit of liquid active ingredient which can be incorporated in the product.

An aqueous suspension of Imidacloprid with an average particle size of less than 2 microns was prepared by wet milling 34.5 parts by weight of Imidacloprid technical, 2 parts of naphthalene sulfonate, 4.0 parts of naphthalene sulfonate condensate and 6 parts of lignin sulfonate in 53.5 parts of water. Sorptive dispersible filler base was then prepared as described in Step 2 of Example 1 by blending a mixture of 2 parts by weight of naphthalene sulfonate, 10.0 parts of lignin sulfonate, 10.0 parts of naphthalene sulfonate condensate, 25.0 parts of mica and 53.0 parts of perlite followed by micronisation to an average particle size of less than 10 microns through an air jet mill. Sorptive water dispersible granules of Imidacloprid were then prepared as described earlier by mixing 0.8 part by weight of Imidacloprid suspension in 39 parts of water with 150.0 parts of filler base followed by extrusion. Then an emulsifiable solution was prepared by dissolving 67.5 parts of Lambda cyhalothrin technical in 12.5 parts of N,N-dimethyl decanamide containing 20.0 parts of ethoxylated tristeryl phenol. Finally 39.0 parts of this emulsifiable solution was sprayed onto 61.0 parts of Imidacloprid granules to get Imidacloprid 0.1%+Lambda cyhalothrin 25.0% WG having the following final composition:

TABLE 15

| Ingredient | % w/w |
| --- | --- |
| Imidacloprid technical (97% a.i) | 0.13 |
| Naphthalene sulfonate | 1.20 |
| Naphthalene sulfonate condensate | 6.20 |
| Lignin sulfonate | 6.20 |
| Perlite | 32.10 |
| Mica | 15.27 |
| Lambda cyhalothrin technical (96% a.i) | 26.30 |
| N.N-dimethyl decanamide | 4.90 |
| Ethoxylated tristeryl phenol | 7.80 |

Evaluation of the synergistic insecticidal effect of the solid agrochemically active substance (imidacloprid, fipronil, thiamethoxam, deltamethrin, tebuconazole and azoxystrobin) and a liquid or a low melting agrochemically active substance (lambda cyhalothrin, cypermethrin, chlorpyrifos and propiconazole) can be established by using any of the WG compositions prepared by the process described in the above examples.

Example 12

The following is an evaluation of the synergistic insecticidal effect of a combination of a Chlorpyrifos 15%+Imidacloprid 1% WG; Chlorpyrifos 15%+Fipronil 6% WG and Chlorpyrifos 15%+Deltamethrin 1% WG in controlling aphids and jassids in the crop Okra (*Abelmoschus esculentum* L)

In this evaluation, percent mortality of aphids and jassids in the crop Okra (*Abelmoschus esculentum* L) is worked out based on the number of aphids and jassids counted before and after sprays and based on the counts before and after sprays. The data is averaged and analyzed for the test of significance.

Details of the Experiment:

Design: Randomized Block Design (RBD)

No. of treatments: 17

No. of replications: 3

Plot Size: 3.0 m*2.5 m

Spacing

Plant to plant: 10.0 cm

Row to row: 50.0 cm

No. of plants per row: 25.0

No. of rows per plot: 6.0

Insect Pests:

Major—Aphid (*Aphis gossypii* Glover)

Minor—Jassid (*Amrasca biguttula biguttula* Ishida)

Products tested:

1. Chlorpyrifos 15%+Imidacloprid 1% WG
2. Chlorpyrifos 15%+Fipronil 6% WG
3. Chlorpyrifos 15%+Deltamethrin 1% WG Standard:

1. Chlorpyrifos 20% EC
2. Imidacloprid 17.8% SL
3. Fipronil 5% SC
4. Deltamethrin 2.8% EC Treatment Details:

TABLE 16

| Sr. No. | Treatment No. | Treatment Details | Dose/hectare g.a.i | g or ml. |
|---|---|---|---|---|
| 1 | $T_1$ | Chlorpyrifos 15% + Imidacloprid 1% WG | 112.3 + 7.5 | 750 |
| 2 | $T_2$ | Chlorpyrifos 15% + Imidacloprid 1% WG | 150 + 10 | 1000 |
| 3 | $T_3$ | Chlorpyrifos 15% + Fipronil 6% WG | 90 + 36 | 600 |
| 4 | $T_4$ | Chlorpyrifos 15% + Fipronil 6% WG | 112.5 + 45 | 750 |
| 5 | $T_5$ | Chlorpyrifos 15% + Deltamethrin 1% WG | 105 + 7.5 | 750 |
| 6 | $T_6$ | Chlorpyrifos 15% + Deltamethrin 1% WG | 140 + 10 | 1000 |
| 7 | $T_7$ | Chlorpyrifos 20% EC | 250 | 1250 |
| 8 | $T_8$ | Imidacloprid 17.8% SL | 22.5 | 125 |
| 9 | $T_9$ | Fipronil 5% SC | 70 | 1500 |
| 10 | $T_{10}$ | Deltamethrin 2.8% EC | 14 | 500 |
| 11 | $T_{11}$ | UNTREATED CHECK | — | — |

Application Description:

TABLE 17

| | |
|---|---|
| Temperature | 34° C. |
| Relative Humidity | 50% |
| Type of Sprayer | Knapsack sprayer |
| Quantity of water used for dilution | 1000 L/ha |

Ten plants were randomly selected and tagged in each plot. The number of nymphs of the aphids and jassids per leaf were counted before and after the spray application. For count of aphids or jassids, 2 leaves from the top and 2 leaves from the middle canopy of the plant were selected and were recorded, before spraying and 1 and 7 days after spraying.

Synergism was calculated by using the Colby and Weeds (1967) method. The expected response of the combination product is calculated by taking the product of the observed response for each individual component (ai) of the combination product when applied alone, divided by 100 and subtracting this value from the sum of the observed response, for each component when applied alone. Synergism is then calculated by comparing the observed and expected response values.

Results and Discussions:

TABLE 18

| Tr. No. | Treatments | Dose per Ha (g or mL) | Number of aphids 0 DBA | 1 DAA | 7 DAA | % Control | Number of jassids 0 DAA | 1 DAA | 7 DAA | % Control |
|---|---|---|---|---|---|---|---|---|---|---|
| $T_1$ | Chlorpyrifos 15% + Imidacloprid 1% WG | 750 | 20 | 12 | 0 | 100.00 | 6 | 1 | 0 | 100 |
| $T_2$ | Chlorpyrifos 15% + Imidacloprid 1% WG | 1000 | 21 | 5 | 0 | 100.00 | 6 | 2 | 0 | 100 |
| $T_3$ | Chlorpyrifos 15% + Fipronil 6% WG | 600 | 19 | 5 | 2 | 89.47 | 7 | 1 | 1 | 85.71 |
| $T_4$ | Chlorpyrifos 15% + Fipronil 6% WG | 750 | 17 | 6 | 1 | 94.12 | 8 | 2 | 0 | 100.00 |

TABLE 18-continued

| Tr. No. | Treatments | Dose per Ha (g or mL) | Number of aphids 0 DBA | Number of aphids 1 DAA | Number of aphids 7 DAA | % Control | Number of jassids 0 DAA | Number of jassids 1 DAA | Number of jassids 7 DAA | % Control |
|---|---|---|---|---|---|---|---|---|---|---|
| $T_5$ | Chlorpyrifos 15% + Deltamethrin 1% WG | 750 | 15 | 5 | 3 | 80.00 | 7 | 0 | 1 | 100.00 |
| $T_6$ | Chlorpyrifos 15% + Deltamethrin 1% WG | 1000 | 20 | 8 | 2 | 90.00 | 6 | 0 | 1 | 100.00 |
| $T_7$ | Chlorpyrifos 20% EC | 1250 | 12 | 6 | 5 | 58.33 | 6 | 1 | 2 | 83.33 |
| $T_8$ | Imidacloprid 17.8% SL | 125 | 18 | 10 | 1 | 94.44 | 9 | 2 | 0 | 100.00 |
| $T_9$ | Fipronil 5% SC | 1500 | 10 | 5 | 4 | 60.00 | 7 | 3 | 1 | 85.71 |
| $T_{10}$ | Deltamethrin 2.8% EC | 500 | 15 | 5 | 5 | 66.67 | 6 | 2 | 4 | 66.67 |
| $T_{11}$ | Untreated Check | — | 14 | 10 | 49 | — | 7 | 9 | 21 | — |

The results indicated that all the chemical treatments with the WG compositions of the invention were able to effectively reduce the aphid and the jassid population and were significantly superior to untreated check. The WG compositions were better in reducing the infestation of aphids and jassids as compared to their stand alone treatments. Chlorpyrifos 15%+Imidacloprid 1% WG @ 1000 g/ha gave the best results in lowering the Aphid and the Jassid population, followed by Chlorpyrifos 15% Imidacloprid 1% WG @ 750 g/ha, as compared to rest of the treatments. None of the chemical treatments showed any adverse phytotoxicity symptoms on the crop plants. The WO compositions displayed promising bio-efficacy results in comparison to stand alone products. Reduced dose rate of combination products were effective and significantly controlled pests as compared to stand alone products.

TABLE 19

Synergistic effect of combination insecticides
(Calculated by Colby and Weeds method):

| Treatment | Dose/Ha (g.a.i) | Aphid - % Control Obs | Aphid - % Control Exp | Aphid - % Control Diff | Jassid - % Control Obs | Jassid - % Control Exp | Jassid - % Control Diff | Synergistic or Not |
|---|---|---|---|---|---|---|---|---|
| Chlorpyrifos 15% + Imidacloprid 1% WG | 150 + 10 | 100 | 97.68 | 2.32 | 100.00 | 100.00 | 0 | Y |
| Chlorpyrifos 15% + Fipronil 6% WG | 112.5 + 45 | 94.12 | 83.33 | 10.79 | 100.00 | 97.62 | 2.38 | Y |
| Chlorpyrifos 15% + Deltamethrin 1% WG | 140 + 10 | 90.00 | 86.00 | 3.00 | 100.00 | 94.44 | 5.56 | Y |
| Chlorpyrifos 20% EC | 250 | 58.33 | — | — | 83.33 | — | — | — |
| Imidacloprid 17.8% SL | 22.5 | 94.44 | — | — | 100.00 | — | — | — |
| Fipronil 5% SC | 70 | 60.00 | — | — | 85.71 | — | — | — |
| Deltamethrin 2.8% EC | 14 | 66.67 | — | — | 66.67 | — | — | — |

All the WG compositions exhibited synergistic effects. The active substance of each component in the WG composition is much lesser than the stand alone products. All the WG compositions, at much lower quantity of actives, as compared to stand alones, showed higher efficacy against Aphids and Jassids. The WG compositions showed higher promise in bio-efficacy as compared to stand alone products.

Example 13

The following is an evaluation of the synergistic insecticidal effect of a combination of a Lambda-Cyhalothrin 6%+Imidacloprid 12% WG, Lambda-Cyhalothrin 3%+Fipronil 12% WG and Cypermethrin 12%+Thiamethoxam 10% WG in controlling aphids and jassids in the crop Okra (*Abelmoschus esculentum* L)

In this evaluation, the percentage mortality of aphids and jassids in the crop Okra (*Abelmoschus esculentum* L) is worked out based on the number of aphids and jassids counted before and after sprays and based on the counts before and after sprays. The data is averaged and analyzed for the test of significance.

Details of the Experiment:
Design: Randomized Block Design (RBD)
No. of Treatments: 18
No. of Replications: 3
Plot Size: 3.0 m*2.5 m
Spacing
   Plant to plant: 10.0 cm
   Row to row: 50.0 cm
No. of plants per row: 25.0
No. of rows per plot: 6.0
Insect Pests:
   Major—Aphid (*Aphis gossypii* Glover)
   Minor—Jassid (*Amrasca biguttula* biguttula Ishida)
Products Tested:
   1. Lambda-Cyhalothrin 6%+Imidacloprid 12% WG
   2. Lambda-Cyhalothrin 3%+Fipronil 12% WG
   3. Cypermethrin 12%+Thiamethoxam 10% WG
Standard:
   1. Cypermethrin 25% EC
   2. Imidacloprid 17.8% SL
   3. Fipronil 5% SC
   4. Thiamethoxam 25% WG
   5. Lambda-Cyhalothrin 5% EC Treatment Details:

TABLE 20

| Sr. No. | Treatment No. | Treatment Details | Dose/hectare g.a.i | g or ml. |
|---|---|---|---|---|
| 1 | $T_1$ | Lambda-Cyhalothrin 6% + Imidacloprid 12% WG | 9 + 18 | 150 |
| 2 | $T_2$ | Lambda-Cyhalothrin 6% + Imidacloprid 12% WG | 10.5 + 21 | 175 |
| 3 | $T_3$ | Lambda-Cyhalothrin 3% + Fipronil 12% WG | 9 + 36 | 300 |
| 4 | $T_4$ | Lambda-Cyhalothrin 3% + Fipronil 12% WG | 10.5 + 42 | 350 |
| 5 | $T_5$ | Cypermethrin 12% + Thiamethoxam 10% WG | 24 + 20 | 200 |
| 6 | $T_6$ | Cypermethrin 12% + Thiamethoxam 10% WG | 60 + 50 | 500 |
| 7 | $T_7$ | Cypermethrin 25% EC | 175 | 700 |
| 8 | $T_8$ | Imidacloprid 17.8% SL | 22.5 | 125 |
| 9 | $T_9$ | Fipronil 5% SC | 70 | 1500 |
| 10 | $T_{10}$ | Thiamethoxam 25% WG | 50 | 200 |
| 11 | $T_{11}$ | Lambda-Cyhalothrin 5% EC | 25 | 500 |
| 12 | $T_{12}$ | UNTREATED CHECK | — | — |

Application Description:

TABLE 21

| | |
|---|---|
| Temperature | 36° C. |
| Relative Humidity | 50% |
| Type of Sprayer | Knapsack sprayer |
| Quantity of water used for dilution | 1000 L/ha |

Ten plants were randomly selected and tagged in each plot. The number of nymphs of the aphids and jassids per leaf were counted before and after the spray application. For count of aphids or jassids, 2 leaves from the top and 2 leaves from the middle canopy of the plant were selected and were recorded, before spraying and 1 and 7 days after spraying.

Synergism was calculated by using the Colby and Weeds (1967) method.

Results and Discussions:

TABLE 22

| Tr. No. | Treatments | Dose per Ha (g or mL) | Number of aphids | | | | Number of jassids | | | |
|---|---|---|---|---|---|---|---|---|---|---|
| | | | 0 DBA | 1 DAA | 7 DAA | % Control | 0 DAA | 1 DAA | 7 DAA | % Control |
| $T_1$ | Lambda-Cyhalothrin 6% + Imidacloprid 12% WG | 150 | 18 | 10 | 0 | 100.00 | 13 | 3 | 0 | 100.00 |
| $T_2$ | Lambda-Cyhalothrin 6% + Imidacloprid 12% WG | 175 | 21 | 8 | 0 | 100.00 | 11 | 1 | 0 | 100.00 |
| $T_3$ | Lambda-Cyhalothrin 3% + Fipronil 12% WG | 300 | 18 | 10 | 5 | 72.22 | 11 | 3 | 5 | 72.73 |

TABLE 22-continued

| Tr. No. | Treatments | Dose per Ha (g or mL) | Number of aphids 0 DBA | 1 DAA | 7 DAA | % Control | Number of jassids 0 DAA | 1 DAA | 7 DAA | % Control |
|---|---|---|---|---|---|---|---|---|---|---|
| $T_4$ | Lambda-Cyhalothrin 3% + Fipronil 12% WG | 350 | 29 | 15 | 2 | 90.10 | 11 | 1 | 1 | 90.91 |
| $T_5$ | Cypermethrin 12% + Thiamethoxam 10% WG | 200 | 17 | 3 | 0 | 100.00 | 11 | 1 | 0 | 100.00 |
| $T_6$ | Cypermethrin 12% + Thiamethoxam 10% WG | 500 | 11 | 2 | 0 | 100.00 | 14 | 0 | 0 | 100.00 |
| $T_7$ | Cypermethrin 25% EC | 700 | 19 | 7 | 17 | 63.16 | 11 | 1 | 3 | 90.91 |
| $T_8$ | Imidacloprid 17.8% SL | 125 | 20 | 9 | 0 | 100.00 | 11 | 6 | 0 | 100.00 |
| $T_9$ | Fipronil 5% SC | 1500 | 17 | 7 | 12 | 58.82 | 11 | 1 | 3 | 72.72 |
| $T_{10}$ | Thiamethoxam 25% WG | 200 | 24 | 2 | 0 | 100.00 | 11 | 2 | 0 | 100.00 |
| $T_{11}$ | Lambda-Cyhalothrin 5% EC | 500 | 10 | 3 | 9 | 70.00 | 13 | 1 | 3 | 76.92 |
| $T_{12}$ | UNTREATED CHECK | — | 18 | 10 | 43 | — | 12 | 2 | 20 | — |

Trial results indicate that all the WG compositions of the invention gave effective control of the aphid and jassids and were significantly superior to untreated check. The WG compositions were better in reducing the infestation as compared to their stand alone treatments. Lambda-Cyhalothrin 6%+Imidacloprid 12% WO @ 175 ml/ha and Cypermethrin 12%+Thiamethoxam 10% WG @ 500 ml/ha were at par and gave the best results in lowering the Aphid and Jassid population. None of the chemical treatments showed any adverse phytotoxicity symptoms on the crop plants. Lower dose rate of the WG compositions are effective and gave significantly better pests control as compared to stand alone products.

Synergistic Effect of Combination Insecticides (by Colby and Weeds Method):

TABLE 23

| Treatment | Dose/Ha (g.a.i) | Aphid - % Control Obs | Exp | Diff | Jassid - % Control Obs | Exp | Diff | Synergistic or Not |
|---|---|---|---|---|---|---|---|---|
| Lambda-Cyhalothrin 6% + Imidacloprid 12% WG | 10.5 + 21 | 100.00 | 100.00 | 0 | 100.00 | 100.00 | 0.0 | Y |
| Lambda-Cyhalothrin 3% + Fipronil 12% WG | 10.5 + 42 | 90.10 | 87.68 | −2.42 | 90.91 | 83.70 | 7.21 | Y |
| Cypermethrin 12% + Thiamethoxam 10% WG | 60 + 50 | 100.00 | 100.00 | 0 | 100.00 | 100.00 | 0 | Y |
| Cypermethrin 25% EC | 175 | 63.16 | — | — | 90.91 | — | — | — |
| Imidacloprid 17.8% SL | 22.5 | 100.00 | — | — | 100.00 | — | — | — |
| Fipronil 5% SC | 70 | 58.82 | — | — | 72.72 | — | — | — |
| Thiamethoxam 25% WG | 50 | 100.00 | — | — | 100.00 | — | — | — |
| Lambda-Cyhalothrin 5% EC | 25 | 70.00 | — | — | 76.92 | — | — | — |

All the WG compositions exhibited synergistic effects. The active substance of each component in the WG composition is much lesser than the stand alone products. All the WG compositions, at much lower quantity of actives, as compared to stand alones, showed higher efficacy against Aphids and Jassids. The WG compositions showed higher better bio-efficacy response as compared to stand alone products at the same quantity of active substances.

Example 14

The following is an evaluation of the synergistic effect of a combination of a Lambda-Cyhalothrin 2.5%+Tebuconazole 12.5% WG; Lambda-Cyhalothrin 2.5%+Azoxystrobin 12.5% WG; Propiconazole 7.5%+Azoxystrobin 7.5% WG in controlling powdery mildew (*Erysiphe cichoracearum*) and mites (*Tetranychus urticae*) in the crop Okra (*Abelmoschus esculentum* L)
Details of the Experiment:
Design: Non-Replicate
No. of treatments: 17
No. of replications: 0 (None)
Plot Size: 4.0 m*2.5 m
Spacing
  Plant to plant: 15.0 cm
  Row to row: 50.0 cm
No. of plants per row: 18.0
No. of rows per plot: 7.0
Treatment Details:

TABLE 24

| Treatment | | | Dose/hectare | |
|---|---|---|---|---|
| Sr. No. | No. | Treatment Details | g.a.i | g or ml. |
| 1 | $T_1$ | Lambda-Cyhalothrin 2.5% + Tebuconazole 12.5% WG | 18.8 + 93.8 | 750 |
| 2 | $T_2$ | Lambda-Cyhalothrin 2.5% + Tebuconazole 12.5% WG | 25 + 125 | 1000 |
| 3 | $T_3$ | Lambda-Cyhalothrin 2.5% + Azoxystrobin 12.5% WG | 18.8 + 93.8 | 750 |
| 4 | $T_4$ | Lambda-Cyhalothrin 2.5% + Azoxystrobin 12.5% WG | 25 + 125 | 1000 |
| 5 | $T_5$ | Propiconazole 7.5% + Azoxystrobin 7.5% WG | 56.5 + 56.3 | 750 |
| 6 | $T_6$ | Propiconazole 7.5% + Azoxystrobin 7.5% WG | 75 + 75 | 1000 |
| 7 | $T_7$ | Azoxystrobin 12.5% EC | 125 | 500 |
| 8 | $T_8$ | Propiconazole 25% EC | 125 | 500 |
| 9 | $T_9$ | Tebuconazole 25% EC | 200 | 800 |
| 10 | $T_{10}$ | Lambda-cyhalothrin 5% EC | 25 | 500 |
| 11 | $T_{11}$ | Sulphur 80% WG | 800 | 1000 |
| 12 | $T_{12}$ | UNTREATED CHECK | — | — |

Application Description:

TABLE 25

| | |
|---|---|
| Temperature | 28° C. |
| Relative Humidity | 81% |
| Type of Sprayer | Knapsack sprayer |
| Quantity of water used for dilution | 1000 L/ha |

The eye estimation of the percent powdery mildew infestation was recorded before spraying and on $3^{rd}$ and $7^{th}$ day after application and graded on the scale of 1 to 10. Also, ten plants were randomly selected and tagged in each plot. The number of mites from two leaves, each of the middle and lower canopy were counted before and after 3 and 7 days of application.
Results and Discussions:

TABLE 26

| Tr. No. | Treatments | Dose per Ha (g or mL) | % Infestation | | | No. of mites | | |
|---|---|---|---|---|---|---|---|---|
| | | | 0 DBA | 7 DAA | % Control | 0 DBA | 7 DAA | % Control |
| $T_1$ | Lambda-Cyhalothrin 2.5% + Tebuconazole 12.5% WG | 750 | 20 | 3 | 85.00 | 28 | 16 | 42.86 |
| $T_2$ | Lambda-Cyhalothrin 2.5% + Tebuconazole 12.5% WG | 1000 | 15 | 1 | 93.33 | 60 | 29 | 51.67 |
| $T_3$ | Lambda-Cyhalothrin 2.5% + Azoxystrobin 12.5% WG | 750 | 11 | 2 | 81.82 | 43 | 20 | 53.49 |
| $T_4$ | Lambda-Cyhalothrin 2.5% + Azoxystrobin 12.5% WG | 1000 | 9 | 2 | 88.89 | 35 | 18 | 48.57 |
| $T_5$ | Propiconazole 7.5% + Azoxystrobin 7.5% WG | 750 | 14 | 0 | 100.00 | 39 | 41 | −5.12 |

TABLE 26-continued

| Tr. No. | Treatments | Dose per Ha (g or mL) | % Infestation 0 DBA | % Infestation 7 DAA | % Control | No. of mites 0 DBA | No. of mites 7 DAA | % Control |
|---|---|---|---|---|---|---|---|---|
| $T_6$ | Propiconazole 7.5% + Azoxystrobin 7.5% WG | 1000 | 22 | 0 | 100 | 44 | 53 | −20.45 |
| $T_7$ | Azoxystrobin 12.5% EC | 500 | 20 | 1 | 95.00 | 21 | 33 | −57.14 |
| $T_8$ | Propiconazole 25% EC | 500 | 15 | 4 | 73.33 | 36 | 42 | −16.67 |
| $T_9$ | Tebuconazole 25% EC | 800 | 16 | 2 | 87.50 | 27 | 41 | −51.85 |
| $T_{10}$ | Lambda-cyhalothrin 5% EC | 500 | 12 | 25 | −108.33 | 34 | 17 | 50.00 |
| $T_{11}$ | UNTREATED CHECK | — | 22 | 48 | −118.18 | 45 | 71 | −57.78 |

Trial results indicated that all the chemical treatments gave increased control of the mites in comparison to the untreated check. The WG compositions were better in reducing the infestation as compared to their stand alone treatments. None of the WG compositions showed any adverse phytotoxicity symptoms on the crop plants.

All the chemical treatments significantly reduced the disease infestation and were superior to untreated control. The WG compositions showed definite advantages as compared to the stand alone treatments. No phytotoxicity was observed in any of the treatments.

Lower dose rate of the WG compositions were effective and gave significantly better disease control as compared to stand alone products.

It was also observed that both the active ingredients of each of the combination products are compatible and did not show any adverse effects on the crop plants. The compatibility is confirmed by giving effective control of pest complex (powdery mildew disease and mites) as compared to the stand alone products of the active substances.

Synergistic Effect of Combination Insecticides (by Colby and Weeds Method):

TABLE 27

| Treatment | Dose/Ha (g.a.i) | Powdery Mildew - % Control Observed | Powdery Mildew - % Control Expected | Powdery Mildew - % Control Difference | Synergistic or Non-synergistic |
|---|---|---|---|---|---|
| Propiconazole 7.5% + Azoxystrobin 7.5% WG | 56.5 + 56.5 | 100.00 | 98.67 | 1.33 | Y |
| Propiconazole 7.5% + Azoxystrobin 7.5% WG | 75 + 75 | 100.00 | 98.67 | 1.33 | Y |
| Propiconazole 25% EC | 125 | 73.33 | — | — | — |
| Azoxystrobin 12.5% EC | 125 | 95.55 | — | — | — |

The WG compositions were more effective in controlling powdery mildew infestation and in comparison have definite advantages over stand alone compositions. It was observed that lower dose rate of the WG compositions gave effective and significantly better disease control as compared to stand alone products.

It was observed that the WG compositions exhibited efficacy in a range of about 5% to about 40% as compared to the stand-alone treatments.

Example 15

Physico-Chemical Properties of the WG Compositions

TABLE 28

| No. | Characteristics | Imidacloprid 12% + Lambda-cyhalothrin 6%. | Fipronil 6% + Chlorpyriphos 15% | Azoxystrobin 7.5% + Propiconazole 7.5% | Tebuconazole 12.5% + Lambda-cyhalothrin 2.5% | Deltamethrin 1% + Chlorpyriphos 14% |
|---|---|---|---|---|---|---|
| 1 | Description | Brown coloured free flowing granules | | | | |
| 2 | A.I (% w/w) | 12.1(Imidacloprid) 5.9(Lambda-cyhalothrin) | 6.2(Fipronil) 15.2(Chlorpyriphos) | 7.3(Azoxystrobin) 7.7(Propiconazole) | 12.8(Tebuconazole) 2.8(Lambda-cyhalothrin) | 1.2(Deltamethrin) 14.4(Chlorpyriphos) |

TABLE 28-continued

| No. | Characteristics | Imidacloprid 12% + Lambda-cyhalothrin 6%. | Fipronil 6% + Chlorpyriphos 15% | Azoxystrobin 7.5% + Propiconazole 7.5% | Tebuconazole 12.5% + Lambda-cyhalothrin 2.5% | Deltamethrin 1% + Chlorpyriphos 14% |
|---|---|---|---|---|---|---|
| 3 | A.I (% w/w) (after ATS)* | 12.1(Imidacloprid) 5.9(Lambda-cyhalothrin | 6.2(Fipronil) 15.0(Chlorpyriphos | 7.1(Azoxystrobin) 7.8(Propiconazole) | 12.4(Tebuconazole) 2.9(Lambda-cyhalothrin) | 1.1(Deltamethrin) 14.4(Chlorpyriphos |
| 4 | Bulk density (g/ml) | 0.75 | 0.66 | 0.57 | 0.82 | 0.64 |
| 5 | pH | 7.8 | 7.1 | 7.5 | 7.7 | 7.1 |
| 6 | Suspensibility (%) | 88.0(Imidacloprid) 94.0(Lambda-cyhalothrin | 75.0(Fipronil) 91.0(Chlorpyriphos | 75.0(Azoxystrobin) 94.0(Propiconazole) | 94.0(Tebuconazole) 97.0(Lambda-cyhalothrin) | 98.0(Chlorpyriphos |
| 7 | Suspensibility (%) after ATS* | 85.0(Imidacloprid) 85.0(Lambda-cyhalothrin | 70.0(Fipronil) 85.0(Chlorpyriphos | 70.0(Azoxystrobin) 85.0(Propiconazole) | 90.0(Tebuconazole) 87.0(Lambda-cyhalothrin) | 90.0(Chlorpyriphos |
| 8 | Dispersibility (%) | 92.0 | 88.0 | 98.0 | 90.0 | 96.0 |
| 9 | Wet sieve test (passing through 200 mesh) | | | Minimum 99.5 | | |

*ATS = Accelerated storage for 14 days at 54 C.

From the foregoing it will be observed that numerous modifications and variations can be effectuated without departing from the true spirit and scope of the novel concepts of the present invention. It is to be understood that no limitation with respect to the specific embodiments illustrated is intended or should be inferred.

We claim:

1. A process of preparing a water dispersible granular composition, the process comprising steps of:
    a) preparing a fine suspension or dispersion of at least one solid agrochemically active substance and at least one first agrochemically acceptable excipient in water;
    b) preparing a filler base of at least one sorptive filler and at least one agrochemically acceptable excipient;
    c) blending the suspension or dispersion of step a) with the filler base of step b) to get a wet mass;
    d) extruding and drying the wet mass of step c) to get water dispersible granules of at least one solid agrochemically active substance;
    e) preparing an emulsifiable solution comprising at least one liquid or low melting agrochemically active substance and at least one second agrochemically acceptable excipient; and,
    f) absorbing the emulsifiable solution of step e) in the water dispersible granules of step d) to obtain the water dispersible granular composition.

2. The process of claim 1, wherein the solid agrochemically active substance is selected from the group comprising at least one of biocides, herbicides, insecticides, fungicides, acaricides, nematicides, pheromones, plant growth regulators and/or repellents.

3. The process of claim 1, wherein the liquid or low melting agrochemically active substance is selected from the group comprising at least one of biocides, herbicides, insecticides, fungicides, acaricides, nematicides, pheromones, plant growth regulators and/or repellents.

4. The process of claim 1, wherein the fine suspension or dispersion of step a) is wet milled to an average particle size of the solid agrochemically active substance of less than 2 microns.

5. A synergistic water dispersible granular product for spray application comprising: a micronized agrochemically active granule comprising at least one micronized solid agrochemically active substance in the range of 0.1% to 45% w/w and an agrochemically active formulation absorbed on to the micronized agrochemically active granule, the active formulation comprising at least one liquid or low melting agrochemically active substance in the range of 0.1% to 25% w/w, made by a process comprising the steps of:
    (a) preparing a micronized fine suspension or dispersion of at least one solid agrochemically active substance and at least one first agrochemically acceptable excipient in water;
    (b) preparing a micronized filler base of perlite and at least one agrochemically acceptable excipient;
    (c) blending the suspension or dispersion of step (a) with the filler base of step (b) to obtain a wet mass;
    (d) extruding and drying the wet mass of step (c) to obtain micronized agrochemically active granules of at least one solid agrochemically active substance;
    (e) preparing an agrochemically active formulation comprising at least one liquid or low melting agrochemically active substance and at least one second agrochemically acceptable excipient; and
    (f) absorbing the agrochemically active formulation of step (e) in the micronized agrochemically active granules of step (d) to obtain the synergistic water dispersible granular product, wherein said synergistic water dispersible granular product forms a stable suspension in water; and exhibits a suspensibility equal to or greater than 70%.

6. The product of claim 5, wherein the solid agrochemically active substance is imidacloprid and the liquid or low melting agrochemically active substance is lambda cyhalothrin.

7. The product of claim 5, wherein the solid agrochemically active substance is fipronil and the liquid or low melting agrochemically active substance is lambda cyhalothrin.

8. The product of claim 5, wherein the solid agrochemically active substance is thiamethoxam and the liquid or low melting agrochemically active substance is cypermethrin.

9. The product of claim 5, wherein the solid agrochemically active substance is imidacloprid and the liquid or low melting agrochemically active substance is chlorpyrifos.

10. The product of claim 5, wherein the solid agrochemically active substance is fipronil and the liquid or low melting agrochemically active substance is chlorpyrifos.

11. The product of claim 5, wherein the solid agrochemically active substance is deltamethrin and the liquid or low melting agrochemically active substance is chlorpyrifos.

12. The product of claim 5, wherein the solid agrochemically active substance is tebuconazole and the liquid or low melting agrochemically active substance is lambda cyhalothrin.

13. The product of claim 5, wherein the solid agrochemically active substance is azoxystrobin and the liquid or low melting agrochemically active substance is lambda cyhalothrin.

14. The product of claim 5, wherein the solid agrochemically active substance is azoxystrobin and the liquid or low melting agrochemically active substance is propiconazole.

15. A synergistic water dispersible granular composition for spray application comprising:
    a micronized agrochemically active granule comprising at least one micronized solid agrochemically active substance in the range of 0.1% to 45% w/w; wherein the granule itself is composed of the micronized solid agrochemically active substance;
    an agrochemically active formulation absorbed to the micronized agrochemically active granule, the formulation comprising at least one liquid or low melting agrochemically active substance in the range of 0.1% to 25% w/w,
    and
    wherein the synergistic water dispersible granular composition forms a stable suspension in water and exhibit a suspensibility equal to or greater than 70%.

16. The composition of claim 15, wherein the solid agrochemically active substance is imidacloprid and the liquid or low melting agrochemically active substance is lambda cyhalothrin.

17. The composition of claim 15, wherein the solid agrochemically active substance is fipronil and the liquid or low melting agrochemically active substance is lambda cyhalothrin.

18. The composition of claim 15, wherein the solid agrochemically active substance is thiamethoxam and the liquid or low melting agrochemically active substance is cypermethrin.

19. The composition of claim 15, wherein the solid agrochemically active substance is imidacloprid and the liquid or low melting agrochemically active substance is chlorpyrifos.

20. The composition of claim 15, wherein the solid agrochemically active substance is fipronil and the liquid or low melting agrochemically active substance is chlorpyrifos.

21. The composition of claim 15, wherein the solid agrochemically active substance is deltamethrin and the liquid or low melting agrochemically active substance is chlorpyrifos.

22. The composition of claim 15, wherein the solid agrochemically active substance is tebuconazole and the liquid or low melting agrochemically active substance is lambda cyhalothrin.

23. The composition of claim 15, wherein the solid agrochemically active substance is azoxystrobin and the liquid or low melting agrochemically active substance is lambda cyhalothrin.

24. The composition of claim 15, wherein the solid agrochemically active substance is azoxystrobin and the liquid or low melting agrochemically active substance is propiconazole.

25. The product of claim 5, wherein the solid agrochemically active substance and the first agrochemically acceptable excipient have an average size of less than 2 microns.

26. The product of claim 5, wherein the first agrochemically acceptable excipient comprises at least one dispersing agent in the range of 1% to 20% w/w.

27. The product of claim 5, wherein the second agrochemically acceptable excipient comprises an emulsifier.

28. The product of claim 5, wherein the second agrochemically acceptable excipient comprises a solvent.

29. The product of claim 26, wherein the dispersing agent comprises at least one of polycarboxylates, naphthalene sulfonate condensates, phenol sulfonic acid condensates, lignosulfonates, methyl oleyl taurates and polyvinyl alcohols.

30. The product of claim 27, wherein the emulsifier comprises at least one non-ionic emulsifier.

31. The product of claim 30, wherein the non-ionic emulsifier comprises at least one of ethoxylated and ethopropoxylated alcohols and nonyl phenols, ethoxylated tristeryl phenol, ethoxylated tristeryl phenol phosphates, ethoxylated and ethopropoxylated castor oil.

32. The product of claim 28, wherein the solvent comprises at least one of N,N-dimethyl decanamide, N-methyl pyrrolidone, cyclohexanone, dimethyl formamide, tetrahydrofuran, dimethylsulfoxide, petroleum distillates and chlorobenzenes.

33. A synergistic water dispersible granular composition for spray application comprising:
    a micronized agrochemically active granule comprising at least one micronized solid agrochemically active substance in the range of 0.1% to 45% w/w; wherein the granule itself is composed of the micronized solid agrochemically active substance; and
    an agrochemically active formulation absorbed to the micronized agrochemically active granule, the formulation comprising at least one liquid or low melting agrochemically active substance in the range of 0.1% to 25% w/w;
    wherein the water dispersible granular composition remains in suspension for spray application and forms a stable suspension in water and exhibits a suspensibility equal to or greater than 70 percent;
    and wherein:
    (a) the solid agrochemically active substance is imidacloprid and the liquid or low melting agrochemically active substance is lambda cyhalothrin;
    (b) the solid agrochemically active substance is fipronil and the liquid or low melting agrochemically active substance is lambda cyhalothrin;
    (c) the solid agrochemically active substance is thiamethoxam and the liquid or low melting agrochemically active substance is cypermethrin;
    (d) the solid agrochemically active substance is imidacloprid and the liquid or low melting agrochemically active substance is chlorpyrifos;
    (e) the solid agrochemically active substance is fipronil and the liquid or low melting agrochemically active substance is chlorpyrifos;
    (f) the solid agrochemically active substance is deltamethrin and the liquid or low melting agrochemically active substance is chlorpyrifos;

(g) the solid agrochemically active substance is tebuconazole and the liquid or low melting agrochemically active substance is lambda cyhalothrin;
(h) the solid agrochemically active substance is azoxystrobin and the liquid or low melting agrochemically active substance is lambda cyhalothrin; or
(i) the solid agrochemically active substance is azoxystrobin and the liquid or low melting agrochemically active substance is propiconazole.

\* \* \* \* \*